(12) United States Patent
Bodas et al.

(10) Patent No.: US 12,017,165 B2
(45) Date of Patent: Jun. 25, 2024

(54) DISTILLATION TRAY HAVING THROUGH HOLES WITH DIFFERENT DIAMETERS

(71) Applicant: SABIC GLOBAL TECHNOLOGIES B.V., Bergen Op Zoom (NL)

(72) Inventors: Vijay Dinkar Bodas, Riyadh (SA); Mohammed Bismillah Ansari, Riyadh (SA)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 322 days.

(21) Appl. No.: 17/608,224

(22) PCT Filed: May 5, 2020

(86) PCT No.: PCT/IB2020/054258
§ 371 (c)(1),
(2) Date: Nov. 2, 2021

(87) PCT Pub. No.: WO2020/225730
PCT Pub. Date: Nov. 12, 2020

(65) Prior Publication Data
US 2022/0249973 A1    Aug. 11, 2022

Related U.S. Application Data

(60) Provisional application No. 62/844,035, filed on May 6, 2019.

(51) Int. Cl.
*B01D 3/22* (2006.01)

(52) U.S. Cl.
CPC ...................... *B01D 3/22* (2013.01)

(58) Field of Classification Search
CPC .................. B01D 3/22; B01D 3/225
See application file for complete search history.

(56) References Cited

U.S. PATENT DOCUMENTS

| 2,973,189 A | 2/1961 | Chin |
| 3,022,054 A | 2/1962 | Kotzebue |

(Continued)

FOREIGN PATENT DOCUMENTS

| EP | 2067512 | 10/2009 |
| GB | 1114716 | 5/1968 |

(Continued)

OTHER PUBLICATIONS

Designers, Specifiers and Buyers Handbook for Perforated Metals, A publication of the Industrial Perforators Association, 124 pages, 1993.

(Continued)

*Primary Examiner* — Renee Robinson
(74) *Attorney, Agent, or Firm* — Norton Rose Fulbright US LLP

(57) ABSTRACT

This disclosure describes one or more trays for use in distillation columns. The trays include a plate having a plurality of through holes that extend between a first surface of the plate and a second surface of the plate. The plurality of through holes include a first set of through holes each having substantially a first diameter and a second set of through holes each having substantially a second diameter that is different from the first diameter. The trays also include a weir coupled to the plate and extending from the first surface. The weir is positioned between the first set of through holes and the second set of through holes.

17 Claims, 4 Drawing Sheets

(56) References Cited

U.S. PATENT DOCUMENTS

| | | | |
|---|---|---|---|
| 3,410,540 A | | 11/1968 | Bruckert |
| 3,717,553 A | | 2/1973 | Otsuki et al. |
| 3,988,213 A | | 10/1976 | Yoshida et al. |
| 4,183,902 A | | 1/1980 | Hashimoto et al. |
| 4,273,618 A | | 6/1981 | Strang, Sr. |
| 4,869,851 A | | 9/1989 | Parker et al. |
| 5,304,353 A | * | 4/1994 | Dente ............... B01J 10/00 564/69 |
| 5,707,563 A | | 1/1998 | Monkelbaan et al. |
| 6,746,003 B2 | | 6/2004 | Lee et al. |
| 6,755,943 B1 | | 6/2004 | Mizutani et al. |
| 6,817,596 B2 | * | 11/2004 | Fischer ............... B01D 3/20 261/114.5 |
| 7,270,316 B2 | | 9/2007 | Burch |
| 9,987,566 B2 | | 6/2018 | Glüer et al. |
| 2003/0019737 A1 | | 1/2003 | Matsumoto et al. |
| 2013/0026667 A1 | | 1/2013 | Ramos |

FOREIGN PATENT DOCUMENTS

| | | |
|---|---|---|
| GB | 1402002 | 8/1975 |
| GB | 2017525 | 10/1979 |
| GB | 2025786 | 1/1980 |
| MY | 125116 | 7/2006 |
| WO | WO 2020225728 | 11/2020 |
| ZA | 200205827 | 3/2003 |

OTHER PUBLICATIONS

Garcia J.A., Fair J.R., "Prediction of performance characteristics", Industrial Engineering Chemistry Research, 2002, 41, 1632-1640. Retrieved from the internet: https://pubs.acs.org/doi/abs/10.1021/ie010326w.

International Search Report and Written Opinion for Application No. PCT/IB2020/054253, dated Jun. 24, 2020, 14 pages.

International Search Report and Written Opinion for Application No. PCT/IB2020/054258, dated Jun. 24, 2020, 15 pages.

Miyahara, et al.; "Gas-liquid interfacial area and liquid-phase mass transfer coefficient in sieve plate columns without downcomer operating at high gas velocities" Department of Applied Chemistry, Okayama University, Okayama 700. Retrieved from the internet: https://www.jstage.jst.go.jp/article/jcej/23/3/23_3_280/_article/-char/ja/.

Office Action issued in corresponding GCC Application No. 2020-39684, dated Jul. 29, 2021.

Office Action issued in corresponding GCC Application No. 2020-39685, dated Jul. 29, 2021.

Takahashi et al.; "Hydrodynamic characteristics of sieve trays having large free areas without downcomers." Department of Industrial Chemistry, Okayama University, Tsushima Okayama 700. Retrieved from the internet: https://www.jstage.jst.go.jp/article/jcej1968/19/4/19_4_339/_article/-char/ja/.

* cited by examiner

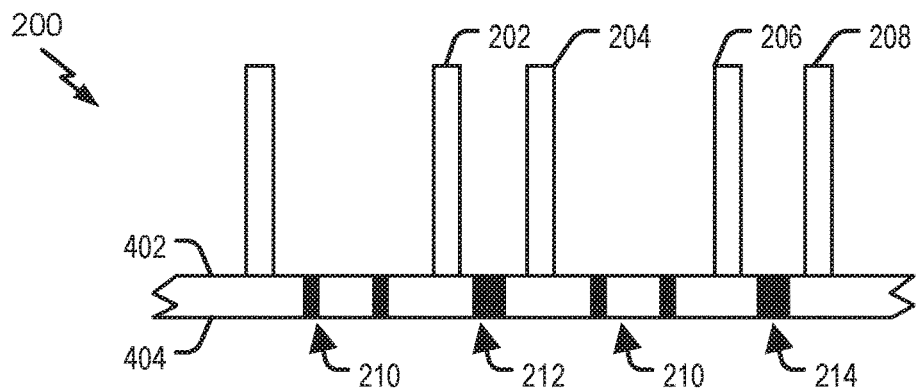
FIG. 4A
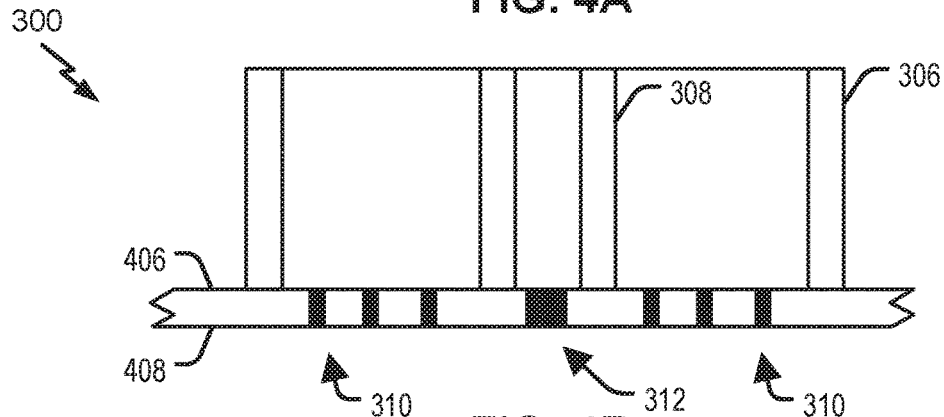
FIG. 4B
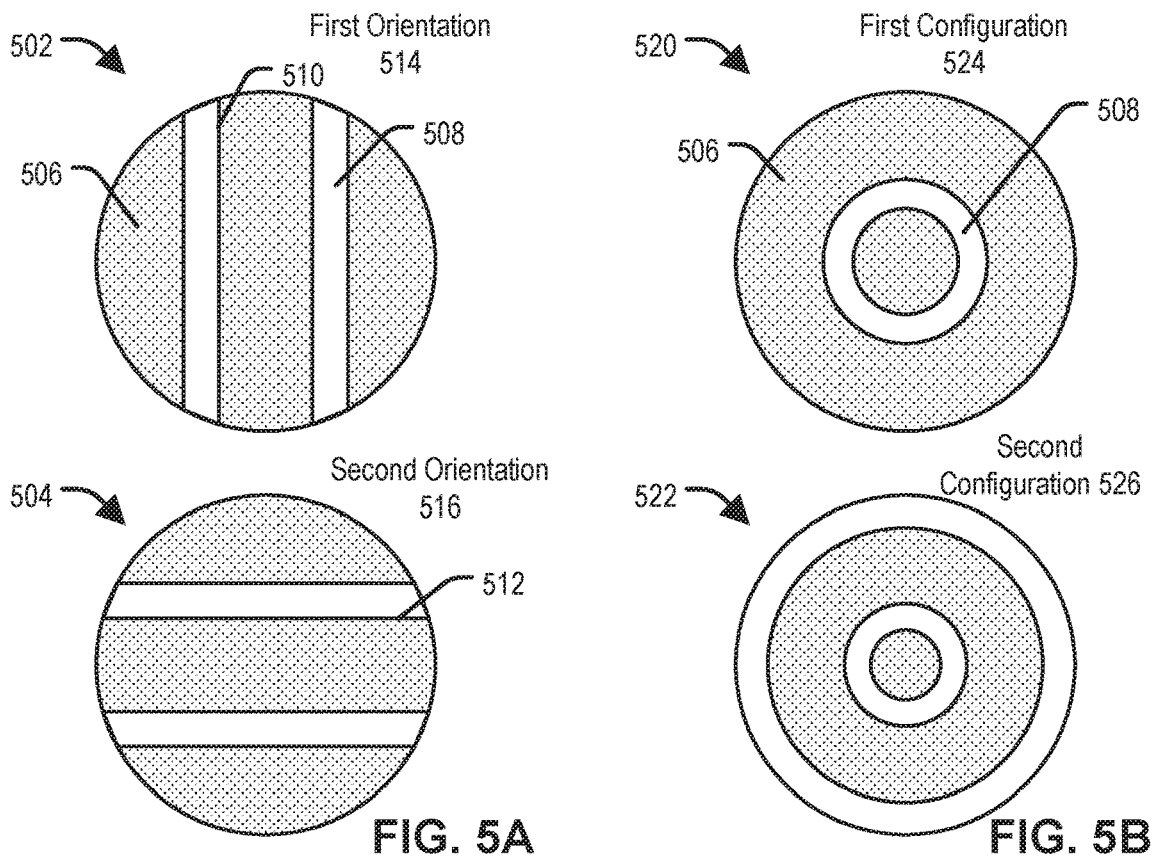
FIG. 5A
FIG. 5B

DISTILLATION TRAY HAVING THROUGH HOLES WITH DIFFERENT DIAMETERS

CROSS-REFERENCE TO RELATED APPLICATIONS

The present application is a national phase under 35 U.S.C. § 371 of International Application No. PCT/IB2020/054258, filed May 5, 2020, which claims the benefit of priority to U.S. Provisional Patent Application No. 62/844,035, filed May 6, 2019, the entire contents of each of which are hereby incorporated by reference in their entirety.

FIELD OF INVENTION

The present disclosure relates generally to one or more trays for use in a distillation column, and, but not by way of limitation, to trays without downcomers.

BACKGROUND

Distillation columns are used to separate liquid feed mixtures into component parts. Distillation columns typically include one or more trays, such as perforated trays, through which liquids flow down and vapors rise up during the separation process. These perforated trays include downcomers, which are conduits that are used to guide the flow of liquids from an upper tray to a lower tray and to allow vapor to pass from the lower tray to the upper tray. Although such trays can perform well in the distillation process, continued use can cause problems. For example, bottom sections of the trays may become fouled by rust and/or debris and, after cleaning, can become physically dislodged during use. Additionally, tray design for high liquid loading processes, such as C3 splitting, isomer separation, or deisobutaniser is challenging due to fouling of the trays often imposing a rate limitation on the distillation process. Typical multipass trays for such processes are structurally complicated and difficult to clean and inspect, resulting in long downtimes for cleaning.

SUMMARY

The present disclosure describes trays for use in distillation columns, and methods, devices, and systems for fabricating such trays. The trays include through holes (e.g., holes that extend between a first surface and a second surface of the trays) that have different diameters. Portions of the tray with through holes having one diameter are separated from portions of the tray having through holes with another diameter by a weir that extends from a surface of the tray. Some of the through holes have sufficiently small diameter such that these through holes may allow liquid to pass to lower trays while allowing vapor to pass upwards. Additionally, through holes with larger diameters may allow liquid to pass to lower trays without allowing vapor to pass upwards in an appreciable amount. In this manner, trays without downcomers may be formed that operate similar to conventional trays with downcomers.

To illustrate, a tray may include a first set of through holes in a first region of the tray and a second portion of through holes in a second region of the tray. The first set of through holes have a first diameter, and the second set of through holes have a second diameter that is different (e.g., larger) than the first diameter. A weir is positioned between the first region and the second region and extends from a surface of the tray. The weir is configured to prevent liquid from leaving one region until the liquid level rises above the height of the weir. For example, if liquid falls from an upper tray into the first region, the liquid does not spread to the second region until the level of the liquid is higher than the height of the weir. The tray of the present disclosure may perform similar to a conventional tray with downcomers by allowing liquid to pass to lower trays while allowing vapor to rise up to upper trays. For example, liquid may pass in one direction through the first set of through holes while vapor passes in an opposite direction. Additionally, liquid may pass in one direction through the second set of through holes (e.g., those with larger diameter), but the liquid may pass with higher volume and pressure such that vapor is substantially blocked.

In some implementations, the weir may extend linearly from one edge of the tray to an opposing edge. In other implementations, the weir may be a circular weir that surrounds the second set of through holes. Although two sets of through holes are described and one weir is described, such description is for illustration only. Trays of the present disclosure may have alternating regions of first through holes and second through holes separated by linear weirs, or alternating circular regions of first through holes and second through holes separated by concentric circular weirs. In still other implementations, hybrid designs that include some linear shaped regions (and weirs) and some circular shaped regions (and weirs) are possible.

The present disclosure also describes systems and methods of fabricating trays without downcomers. For example, a method may include forming a first set of through holes between two surfaces of the tray, followed by forming a second set of through holes between the two surfaces of the tray. The first set of through holes and the second set of through holes have different diameters. The method may also include attaching a weir to the tray between the first set of through holes and the second set of through holes. For example, a linearly extending weir or a circular weir may be attached to the tray to separate the first set of through holes from the second set of through holes.

Thus, the present disclosure describes perforated trays (e.g., trays with through holes) without downcomers, and methods, devices, and systems of fabricating the trays. Because of the selection of the diameter of the through holes, the trays are able to operate similar to trays with downcomers. Additionally, because there are no downcomers, the trays are less complex and less expensive to fabricate. Additionally, the lack of downcomers decreases the likelihood that the trays will be fouled by rust and/or debris, which increases the useful life of the trays and reduces downtime of distillation columns for cleaning.

In some of the foregoing embodiments, a tray for use in a distillation column comprises a plate comprising a first surface and a second surface opposite the first surface. The plate has a plurality of through holes extending between the first surface and the second surface. The plurality of through holes comprises: a first set of through holes each having substantially a first diameter; and a second set of through holes each having substantially a second diameter different from the first diameter. The tray also comprises a weir coupled to the plate and extending from the first surface. The weir is positioned between the first set of through holes and the second set of through holes.

In some such embodiments, the first set of through holes and the second set of through holes are configured to enable liquid to flow below the plate without use of downcomers. Additionally, or alternatively, the first set of through holes comprises a first plurality of through holes, and the second set of through holes comprises a second plurality of through holes. Additionally, or alternatively, the second diameter is larger than the first diameter. In some such embodiments, the first diameter is substantially 4.75 millimeters and the second diameter is substantially 19 millimeters. Alternatively, the first diameter is between 4.75 millimeters (mm) and 12.5 mm and the second diameter is between 12.5 mm and 19 mm.

In some such embodiments, the tray further comprises a second weir and a third weir extending from the first surface. The weir, the second weir, and the third weir are positioned in parallel across the plate, the first set of through holes are disposed between the second weir and the weir, and the second set of through holes are disposed between the weir and the third weir. Alternatively, the tray further comprises a second weir and a third weir extending from the first surface. The weir, the second weir, and the third weir define concentric circles, the first set of through holes are disposed between the second weir and the weir, and the second set of through holes are disposed between the weir and the third weir. Additionally, or alternatively, a diameter of the tray is greater than or equal to 2 meters.

In some of the foregoing embodiments, a tray for use in a distillation column comprises a plate comprising a first surface and a second surface opposite the first surface. The plate has a plurality of through holes extending between the first surface and the second surface. The plurality of through holes comprises: a first set of through holes each having a first diameter within a first range; a second set of through holes each having a second diameter within a second range different from the first range; a third set of through holes each having a third diameter within the first range; and a fourth set of through holes each having a fourth diameter within the second range. The tray also comprises a plurality of weirs coupled to the plate and extending from the first surface. The plurality of weirs comprises: a first weir positioned between the first set of through holes and the second set of through holes; a second weir positioned between the second set of through holes and the third set of through holes; and a third weir positioned between the third set of through holes and the fourth set of through holes.

In some such embodiments, the first weir and the second weir are positioned in parallel across the plate, the first set of through holes are disposed on an opposite side of the first weir than the second set of through holes, and the second set of through holes are disposed between the first weir and the second weir. In some such embodiments, the tray further comprises a fourth weir. The third weir and the fourth weir are positioned in parallel to the first weir and the second weir, the third set of through holes are disposed between the second weir and the third weir, and the fourth set of through holes are disposed between the third weir and the fourth weir. In some alternate embodiments, the tray further comprises a fourth weir and a fifth weir extending from the first surface. The third weir, the fourth weir, and the fifth weir define concentric circles or portions of circles, the third set of through holes are disposed between the third weir and the fourth weir, and the fourth set of through holes are disposed between the fourth weir and the fifth weir.

In some such embodiments, the first weir and the second weir form concentric circles, the first set of through holes are disposed outside of the first weir, and the second set of through holes are disposed between the first weir and the second weir. In some such implementations, the tray further comprises a fourth weir extending from the first surface. The third weir and the fourth weir are positioned in parallel across a circle formed by the second weir, the third set of through holes are disposed between the second weir and the third weir, and the fourth set of through holes are disposed between the third weir and the fourth weir.

In some of the foregoing embodiments, a system comprises a distillation column comprising a housing defining a chamber. The system also comprises a plurality of trays positioned within the chamber. The plurality of trays comprise at least one tray comprising a plate comprising a first surface and a second surface opposite the first surface. The plate has a plurality of through holes extending between the first surface and the second surface. The plurality of through holes comprises: a first set of through holes each having substantially a first diameter; and a second set of through holes each having substantially a second diameter different from the first diameter. The at least one tray also comprises a weir coupled to the plate and extending from the first surface. The weir is positioned between the first set of through holes and the second set of through holes.

In some such embodiments, the plurality of trays further comprises a second tray that is positioned proximate to the at least one tray within the chamber. In some such embodiments, the at least one tray includes a plurality of weirs extending from the first surface in parallel across the plate in a first orientation and the second tray includes a second plurality of weirs extending from a surface of a second plate of the second tray in parallel across the second plate in a second orientation that is different than the first orientation. In a particular embodiment, the second orientation is substantially perpendicular to the first orientation. In some such embodiments, a third tray includes a third plurality of weirs extending from a surface of a third plate and forming concentric circles that separate sets of through holes having substantially the first diameter from sets of through holes having substantially the second diameter and a fourth tray includes a fourth plurality of weirs extending from a surface of a fourth plate of the fourth tray and forming concentric circles that separate sets of through holes having the substantially second diameter from sets of through holes having substantially the first diameter.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise.

The term "about" as used herein can allow for a degree of variability in a value or range, for example, within 10%, within 5%, or within 1% of a stated value or of a stated limit of a range, and includes the exact stated value or range. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementation, the term "substantially" may be substituted with "within [a percentage] of" what is specified, where the percentage includes 0.1, 1, or 5 percent; and the term "approximately" may be substituted with "within 10 percent of" what is specified. The statement "substantially X to Y" has the same meaning as "substantially X to substantially Y," unless indicated otherwise. Likewise, the statement "substantially X, Y, or substantially Z" has the same meaning as "substantially X, substantially Y, or substantially Z," unless indicated otherwise. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Similarly, the phrase "A, B, C, or a combination thereof" or "A, B, C, or any combination thereof" includes: A alone, B alone, C alone, a combination of A and B, a combination of A and C, a combination of B and C, or a combination of A, B, and C.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any implementation of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where".

Further, a device or system that is configured in a certain way is configured in at least that way, but it can also be configured in other ways than those specifically described. The feature or features of one implementation may be applied to other implementations, even though not described or illustrated, unless expressly prohibited by this disclosure or the nature of the implementations.

Some details associated with the implementations are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the implementation depicted in the figures. Views identified as schematics are not drawn to scale.

FIGS. 4A and 4B illustrate schematic sectional views of the first implementation and the second implementation of the plate.

FIGS. 5A and 5B illustrate top views of multiple plates having through holes with different diameters.

DETAILED DESCRIPTION OF ILLUSTRATIVE IMPLEMENTATIONS

Figure 1:
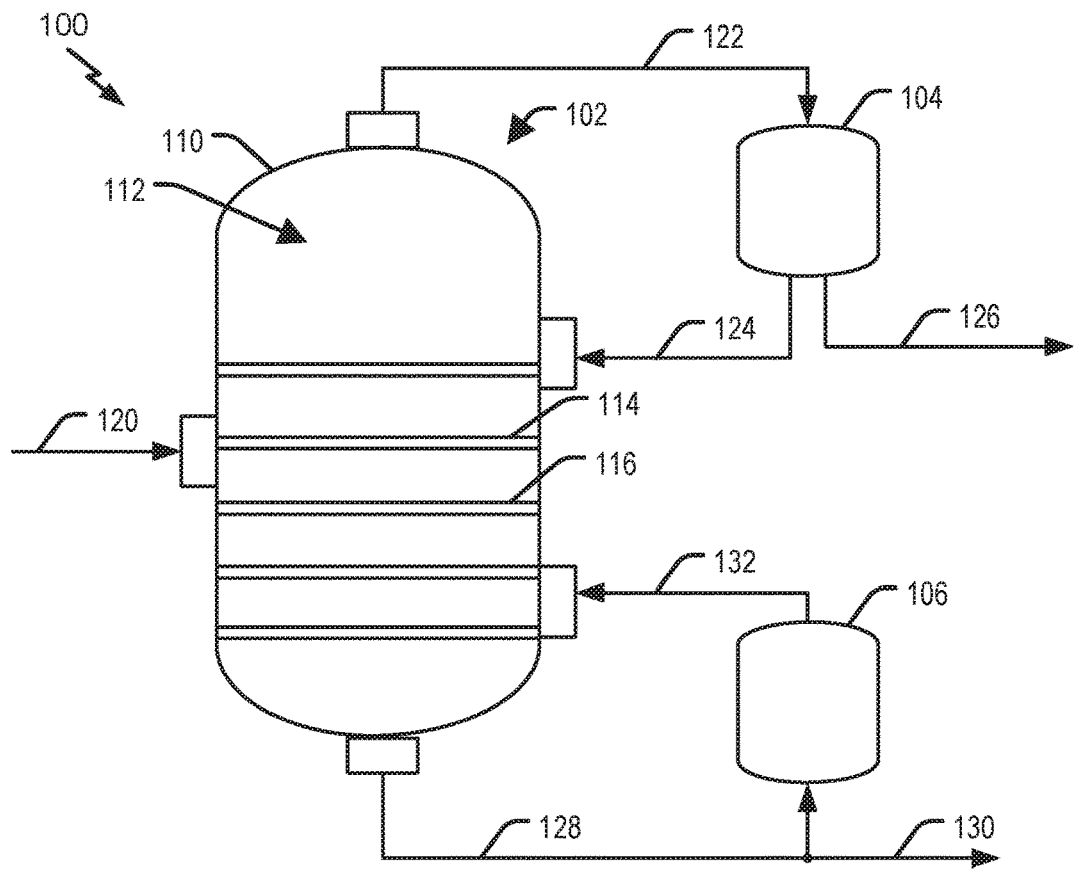
FIG. 1 is a diagram that illustrates an example of a system for performing distillation that includes a tray with through holes having different diameters.

Referring to FIG. 1, a diagram of a system 100 for performing distillation is shown. The system 100 includes at least one tray that includes through holes of different diameters, as further described herein. As used herein, through holes may also be referred to as perforations.

System 100 includes a distillation column 102, a condenser 104, and a reboiler 106. Distillation column 102 is coupled to condenser 104 via conduits, such as a tubes, and distillation column 102 is coupled to reboiler 106 via conduits, such as tubes. In some implementations, system 100 includes additional components, such as one or more pumps, gravity separators, additional condensers, or a combination thereof, which are not illustrated for convenience.

The distillation column 102 includes a housing 110 defining a chamber 112 and a plurality of trays positioned within the chamber. For example, the plurality of trays may include an illustrative first tray 114 and an illustrative second tray 116. Second tray 116 may be positioned proximate (e.g., below, in the orientation illustrated in FIG. 1) to first tray 114 within chamber 112. In a particular implementation, a diameter of at least one tray is greater than or equal to two meters (e.g., as small as 2 to 3 meters). Alternatively, the diameter may be as large as seven meters. Although twelve trays are illustrated in FIG. 1, in other implementations, distillation column 102 may include fewer than twelve or more than twelve trays. At least some of the plurality of trays do not have downcomers. Downcomers are conduits that guide liquid from an upper tray to a lower tray. In a particular implementation, each tray of the plurality of trays does not have downcomers. Additionally, at least one of the trays, such as first tray 114, may include a plate with a plurality of through holes, the plurality of through holes including a first set of through holes each having substantially a first diameter and a second set of through holes each having substantially a second diameter that is different than the first diameter, in addition to a weir extending from a surface of the plate and disposed between the sets of through holes, as further described herein at least with reference to FIGS. 2-3 and 6-7.

In a particular implementation, distillation column 102 is a cylindrical column. For example, distillation column 102 may have a diameter of up to 7 meters (m) (e.g., between 5 and 7 m). The trays may be supported on vessel wall rings along housing 110 using tray ends along with cross bars for large diameters (when needed). Alternatively, the plurality of trays may be supported by a support structure that extends vertically along housing 110. In a particular implementation, the support structure is steel. In other implementations, other metals or materials may be used. In some implementations, the plurality of trays each include a support beam, or other support structure, coupled to a surface (e.g., a bottom surface) of the trays to support the weight of the trays and keep the trays from bending or bowing.

Distillation column 102 is configured to distill (e.g., to separate) a liquid feed including a mixture of multiple liquids into the component parts. This is accomplished by heating the liquid feed to a temperature that is above a boiling point of one of the components but below a boiling point of another component. As the liquid feed is heated (e.g., by a heating unit of distillation column 102), one of the components (in liquid form) flows down (e.g., from higher trays to lower trays) through holes in the plurality of trays while another of the components is converted to vapor (e.g., gas), which flows up the plurality of trays through the holes.

Condenser 104 is coupled to distillation column 102 and configured to receive the vapor from the distillation column. Condenser 104 is configured to cool the vapor such that the vapor converts to a liquid. Because the vapor is substantially the component of the liquid feed with the lower boiling point, the liquid formed in the condenser is the liquid form of the lower boiling point component (that was originally mixed in the liquid feed). Condenser 104 is configured to provide some of this liquid as an output product and to provide the rest of the liquid back to distillation column 102 as reflux for use in the distillation process.

Reboiler 106 is coupled to distillation column 102 and configured to receive the liquid from the distillation column. Some of this liquid (e.g., the liquid form of the component with the higher boiling point) is provided as an output product. Reboiler 106 is configured to boil the remainder of the liquid to convert the liquid to vapor. This vapor is returned to distillation column 102 for use in the distillation process.

During operation of the system 100, distillation column 102 receives liquid feed 120 at a first input. Liquid feed 120 includes a combination of at least two liquid components (e.g., chemicals). As an illustrative, non-limiting example, liquid feed 120 may include butane and isobutane. Liquid feed 120 is provided to one or more of the plurality of trays within distillation column 102, and, as liquid feed 120 is heated, vapor of the first component flows up the plurality of trays while liquid of the second component flows down the plurality of trays. For example, liquid may flow down from first tray 114 to second tray 116 via through holes in the first tray, and vapor 122 may flow up from the second tray to the first tray via the through holes.

As vapor 122 (that is substantially the first component) rises to the top of distillation column 102, vapor 122 is provided from a first output port of the distillation column to condenser 104. Condenser 104 cools vapor 122 to convert the vapor to liquid (e.g., a liquid form of substantially the first component). A first portion of this liquid is provided as reflux 124 to a second input port of distillation column 102 for use in the distillation process. A second portion of this liquid is provided as first output product 126 (e.g., liquid of the first component).

Additionally, as the liquid in distillation column 102 flows toward the bottom, the liquid (which is substantially the second component) exits the distillation chamber via a second output port as liquid 128. A first portion of liquid 128 is provided as second output product 130 (e.g., liquid of the second component). A second portion of liquid 128 is provided to reboiler 106. Reboiler 106 heats liquid 128 to convert the liquid to vapor (e.g., a gas), and the vapor is provided as return vapor 132 to a third input port of distillation column 102 for use in the distillation process.

System 100 includes trays that are less complex and less costly to fabricate than conventional trays. For example, as further described herein, at least one tray of distillation column 102 includes through holes having different diameters and no downcomers. Such a tray is less complex and less costly to fabricate than a typical sieve tray with downcomers. Additionally, such a tray is easier to clean, which reduces downtime of the system 100 for cleaning. Additionally, such a tray is less likely to be fouled by rust and/or debris, thereby extending the useful life of the tray.

Figure 2:
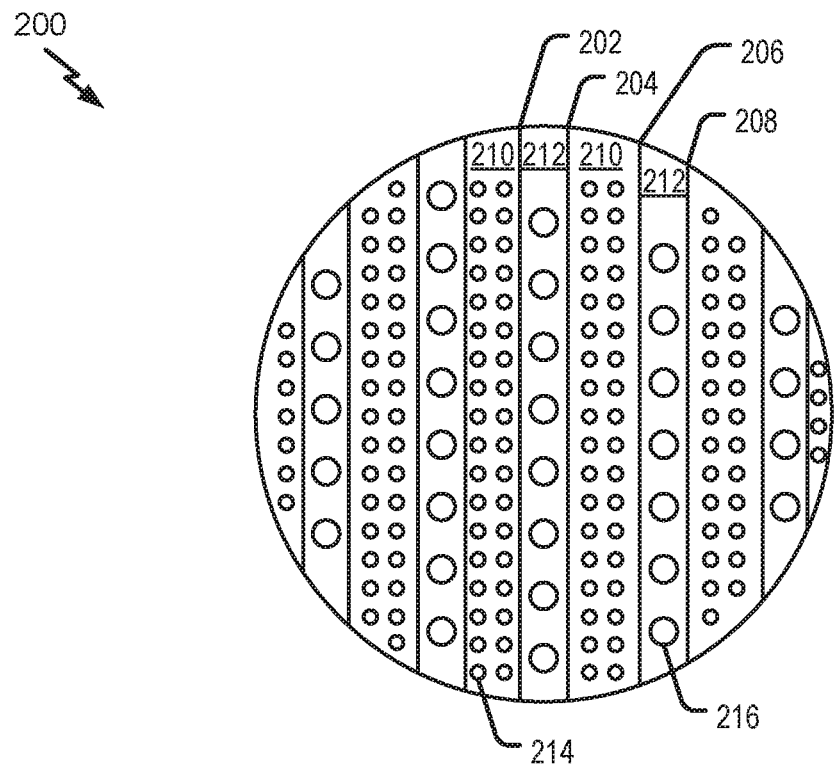
FIG. 2 illustrates a top view of a first implementation of a plate that includes through holes having different diameters.

Referring to FIG. 2, a plate 200 that includes through holes (e.g., perforations) having different diameters is shown. A tray, such as a distillation tray, may include plate 200. In a particular implementation, first tray 114 and/or second tray 116 of FIG. 1 include plate 200. Plate 200 includes a plurality of through holes extending from a first surface (e.g., a top surface) to a second surface (e.g., a bottom surface). The plurality of through holes includes a first set of first through holes 210 and a second set of second through holes 212. First through holes 210 include through holes having a first diameter, such as illustrative first through hole 214. Second through holes 212 include through holes having a second diameter that is different than the first diameter, such as illustrative second through hole 216.

In a particular implementation, the second diameter is larger than the first diameter. In other implementations, the second diameter is less than the first diameter. In a particular implementation, the first diameter is one of substantially 19 millimeters (mm), 12.5 mm, or 4.75 mm, and the second diameter is one of substantially 19 mm, 12.5 mm, or 4.75 mm but not equal to the first diameter. For example, the first diameter may be substantially 12.5 mm and the second diameter may be substantially 19 mm. As another example, the first diameter may be substantially 4.75 mm, and the second diameter may be substantially 12.5 mm. As another example, the first diameter may be substantially 4.75 mm, and the second diameter may be substantially 19 mm. In a particular implementation, the first diameter is between 4.75 mm to 12.5 mm (or between 0.1875 and 0.5 inches), and the second diameter is between 12.5 mm and 19 mm (or between 0.5 and 0.75 inches). In other implementations, other size diameters are possible.

Plate 200 also includes weirs separating regions with first through holes 210 from regions with second through holes 212. The weirs are coupled to plate 200 and extend from the first surface (e.g., top surface) of the plate. For example, plate 200 includes a first weir 202 coupled to the plate and extending from the first surface. First weir 202 is positioned between a first set of first through holes 210 and second set of second through holes 212. In a particular implementation, the first set of first through holes 210 include a first plurality of through holes, and the second set of second through holes 210 include a second plurality of through holes, as illustrated in FIG. 2.

In the particular implementation illustrated in FIG. 2, regions of first through holes 210 are interspersed with regions of second through holes 212, and weirs are disposed between the regions of different through hole sizes. For example, plate 200 includes a first set of first through holes 210, a second set of second through holes 212, a third set of first through holes 210, and a fourth set of second through holes 212. Plate 200 also includes first weir 202, a second weir 204, a third weir 206, and a fourth weir 208 that are coupled to the plate and that extend from a first surface (e.g., a top surface) of the plate. First weir 202, second weir 204, third weir 206, and fourth weir 208 extend linearly and are positioned in parallel across plate 200. First weir 202 is positioned between the first set of first through holes 210 and the second set of second through holes 212 and second weir 204 is positioned between the second set of second through holes 212 and the third set of first through holes 210, such that the first set of first through holes 210 are disposed on an opposite side of first weir 202 than the second set of second through holes 212, and the second set of second through holes 212 are disposed between first weir 202 and second weir 204. In a particular implementation, the first set of first through holes 210 are disposed between first weir 202 and another weir. Third weir 206 is positioned between the third set of first through holes 210 and the fourth set of second through holes 212 and fourth weir 208 is positioned between the fourth set of second through holes 212 and a fifth set of first through holes 210 such that the third set of first through holes 210 are disposed between second weir 204 and third weir 206, and the fourth set of second through holes 212 are disposed between third weir 206 and fourth weir 208. Although six regions of first through holes 210, five regions of second through holes 212, and ten weirs are illustrated, in other implementations, different numbers of regions with first through holes 210, different numbers of regions with second through holes 212, and different numbers of weirs are possible.

Weirs 202-208 are pieces of metal (or other material) that extend from the surface of plate 200 and are configured to maintain a particular liquid level within a region of the plate (e.g., when a liquid level exceeds the height of the weir, the liquid is able to flow over the weir into another region). Weirs are typically rectangular, though in other implementations the weirs have other shapes. In a particular implementation, weirs 202-208 have heights between approximately two to four inches (e.g., weirs 202-208 extend approximately two to approximately four inches from plate 200). In other implementations, the heights may be less than two or more than four inches.

The first set of first through holes 210, the second set of second through holes 212, the third set of first through holes 210, and the fourth set of second through holes 212 are configured to enable liquid to flow from the first surface to the second surface and below plate 200 without use of downcomers. For example, if plate 200 is included in first tray 114, the sets of through holes enable liquid to flow down to second tray 116. First through holes 210 are sized such that vapor may also flow (e.g., bubble up) from second tray 116 to first tray 114 (e.g., plate 200), while second through holes 212 are sized to provide fast enough fluid downflow to substantially prevent vapor from flowing up (or to prevent an appreciable amount of vapor from flowing up). Because liquid is able to flow down first through holes 210 and second through holes 212, and vapor is able to flow up first through holes 210, plate 200 (e.g., first tray 114) is configured to operate similar to a distillation tray with multiple downcomers. However, plate 200 does not include any downcomers, which simplifies the fabrication and reduces the cost of the plate, while also improving the cleaning of the plate.

In a particular implementation, first through holes 210 and second through holes 212 can have measurements according to Table 1.

TABLE 1

| U.S. Hole Diameter (inches) | ¾ | ½ | 3/16 |
|---|---|---|---|
| Tolerance (inches) | 0.38 | 0.28 | 0.21 |
| Metric Hole Diameter (mm) | 19 | 12.5 | 4.75 |
| Tolerance (mm) | 0.015 | 0.011 | 0.008 |

In another particular implementation, first through holes 210 and second through holes 212 can have measurements according to Table 2.

TABLE 2

| IPA Numbers | Perforations (inches) | Centers (inches) | Holes per square inch | Open Area | Line |
|---|---|---|---|---|---|
| 118 | 3/16 | ¼ | 19 | 51% | Staggered |
| 128 | ½ | 11/16 | 2 | 47% | Staggered |
| 103 | ½ | 11/16 | 3 | 53% | Straight |
| 131 | ¾ | 1 | 1 | 51% | Staggered |
| 204 | ¾ | 1 | 1 | 56% | Straight |

In Table 2, perforations refer to the diameter of the through holes (e.g., first through holes 210 or second through holes 212), centers refers to the spacing between adjacent through holes, open area refers to the space of a corresponding region not occupied by through holes, and line refers to the orientation of the through holes (relative to each other) within a region.

Table 3 shows vapor and liquid loading and flooding performance of a tray in a NC4, IC4 isomer separation column.

TABLE 3

| Liquid rate | 3801000 kilograms(kg)/hour(hr) |
|---|---|
| Vapor rate | 1905596 kg/hr |
| Molecular weight liquid | 58 kg/kgmol |
| Molecular weight vapor | 58 kg/kgmol |
| Liquid density | 650 kg/m$^3$ |
| Vapor density | 14.01 kg/m$^3$ |
| Flood parameters | 0.29 |
| Csb | 0.25 feet(ft)/second(s) |
| Csb | 0.08 m/s |
| Flood velocity | 3.46 m/s |
| Vapor velocity | 2.47 m/s |
| % of flood | 71.53% |

In Table 4, measurements of a non-circular straight weir type layout that segregates small and large perforation areas as segments of a circular column diameter are shown. AD refers to segment area (in m$^2$) and H/D refers to chord height/distillation column diameter. The reference formulas used for Table 4 are those of chords of a circle and section areas of a circle on either side of the chord. The data in Table 4 is developed for a column 6 meters in internal diameter, with cross-sectional area 28.2743 m$^2$, having a total of ten areas with large perforation holes. In this implementation, corresponding weir loading is 20.18 gallon per minute/inch (gpm/inch) weir length.

TABLE 4

| Number of downcomer-like zones plus one | (H/D) | (AD) | Large perforation exit hole area (m²) | Large perforation inlet area (m²) | Unperforated sieve tray deck area (m²) | Small perforation sieve hole tray deck area (m²) |
|---|---|---|---|---|---|---|
| 0 | 0 | 0 | 0 | | 0 | 0 |
| 1 | 0.0909 | 1.2792 | 0.0284 | 0.4147 | 1.2792 | 0.6524 |
| 2 | 0.1818 | 3.5112 | 0.0567 | 0.5428 | 2.2320 | 1.1383 |
| 3 | 0.2727 | 6.2465 | 0.0851 | 0.6211 | 2.7353 | 1.3950 |
| 4 | 0.3636 | 9.2896 | 0.1134 | 0.6674 | 3.0431 | 1.5520 |
| 5 | 0.4545 | 12.5031 | 0.1418 | 0.6882 | 3.2134 | 1.6388 |
| 6 | 0.5455 | 15.7713 | 0.1418 | 0.6858 | 3.2682 | 1.6668 |
| 7 | 0.6364 | 18.9847 | 0.1134 | 0.6599 | 3.2134 | 1.6388 |
| 8 | 0.7273 | 22.0278 | 0.0851 | 0.6076 | 3.0431 | 1.5520 |
| 9 | 0.8182 | 24.7631 | 0.0567 | 0.5210 | 2.7353 | 1.3950 |
| 10 | 0.9091 | 26.9951 | 0.0284 | 0.3769 | 2.2320 | 1.1383 |
| 11 | 1 | 28.2743 | | 0.4147 | 1.2792 | 0.6524 |
| Total Areas | | | 0.506 | 6.2001 | 28.2743 | 14.4199 |

Although first through holes 210 and second through holes 212 are described as having the same diameter, in other implementations, the through holes may have diameters selected from within the same range. To illustrate, a first set of through holes (e.g., first through holes 210 to the left of first weir 202 in FIG. 2) may each have a first diameter within a first range, a second set of through holes (e.g., second through holes 212 between first weir 202 and second weir 204) may each have a second diameter within a second range that is different than the first range, a third set of through holes (e.g., first through holes 210 between second weir 204 and third weir 206) may have a third diameter within the first range, and a fourth set of through holes (e.g., second through holes 212 between third weir 206 and fourth weir 208) may have a fourth diameter within the second range. In a particular implementation, the first range is between 4.75 mm to 12.5 mm (or between 0.1875 and 0.5 inches), and the second range is between 12.5 mm and 19 mm (or between 0.5 and 0.75 inches). Thus, in some implementations, different regions of first through holes 210 and different regions of second through holes 212 may have different diameters within a corresponding range. In some implementations, the weirs may define different areas having through holes with different diameters. For example, first through holes 210 in an area defined by a first group of weirs may have different diameters than first through holes 210 in a second area defined by a second group of weirs.

Plate 200 thus enables liquid to flow through first through holes 210 and second through holes 212, and vapor to flow through first through holes 210. Because liquid and vapor can flow in this manner, downcomers are not used. Refraining from using downcomers reduces the complexity and cost of fabricating plate 200. Additionally, cleaning may be easier and plate 200 may be less likely to be fouled by rust and/or debris, thereby extending the useful life of plate 200.

Figure 3:
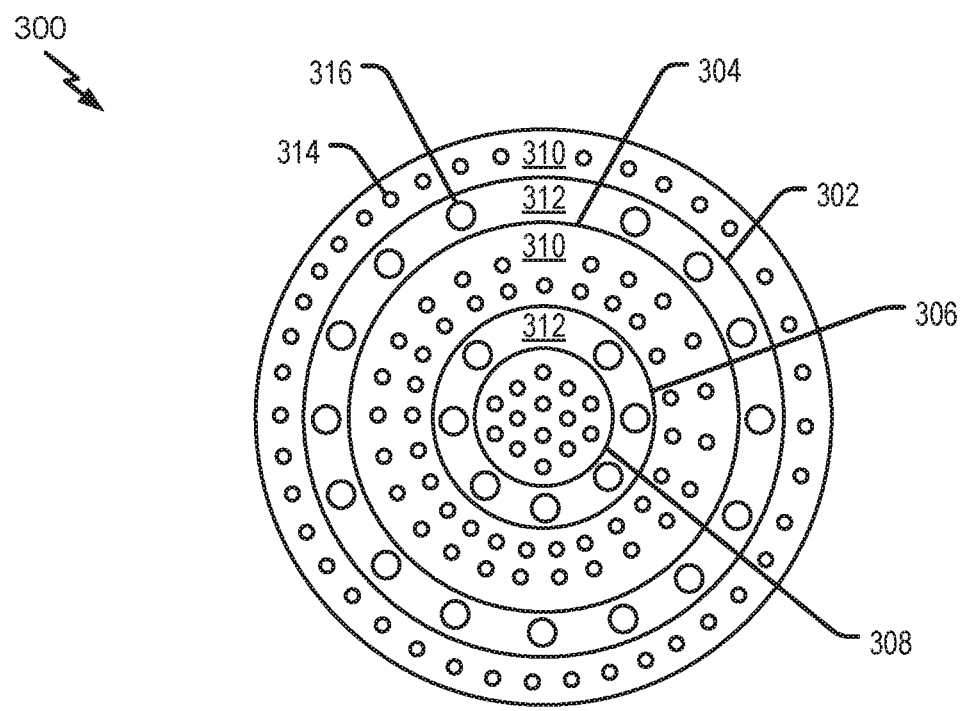
FIG. 3 illustrates a top view of a second implementation of a plate that includes through holes having different diameters.

Referring to FIG. 3, a plate 300 that includes through holes having different diameters is shown. A tray, such as a distillation tray, may include plate 300. In a particular implementation, first tray 114 and/or second tray 116 of FIG. 1 may include plate 300. Plate 300 includes a plurality of through holes extending from a first surface (e.g., a top surface) to a second surface (e.g., a bottom surface). The plurality of through holes includes a first set of first through holes 310 and a second set of second through holes 312. First through holes 310 include through holes having a first diameter, such as illustrative first through hole 314. Second through holes 312 include through holes having a second diameter that is different than the first diameter, such as illustrative second through hole 316. In a particular implementation, the second diameter is greater than the first diameter, and the first and second diameters may have measurements as described with reference to FIG. 2. For example, first through holes 310 may include or correspond to the first through holes 210 of FIG. 2, and second through holes 312 may include or correspond to second through holes 212 of FIG. 2.

In the particular implementation illustrated in FIG. 3, regions of first through holes 310 are interspersed with regions of second through holes 312, and weirs are disposed between the regions of different through hole sizes. For example, plate 300 includes a first set of first through holes 310, a second set of second through holes 312, a third set of first through holes 310, and a fourth set of second through holes 312. Plate 300 also includes first weir 302, a second weir 304, a third weir 306, and a fourth weir 308 that are coupled to the plate and that extend from a first surface (e.g., a top surface) of the plate. First weir 302, second weir 304, third weir 306, and fourth weir 308 define concentric circles, and regions containing the first through holes 310 and the second through holes 312 define concentric circular regions. Weirs are disposed between circular regions of through holes having different diameters. For example, the first set of first through holes 310 are disposed outside first weir 302, the second set of through holes 312 are disposed between first weir 302 and second weir 304, the third set of first through holes 310 are disposed between second weir 304 and third weir 306, and the fourth set of second through holes 312 are disposed between third weir 306 and fourth weir 308. Although three regions of first through holes 310, two regions of second through holes 312, and four weirs are shown in FIG. 3, in other implementations, plate 300 includes a different number of regions of first through holes 310, a different number of regions of second through holes 312, and/or a different number of weirs.

In a particular implementation, capacity design of plate 300 is given by Table 5.

TABLE 5

| Large perforation outer circle (m) | Large perforation inner circle (m) | Outer weir (m) | Inner weir (m) | Weir length (m) |
|---|---|---|---|---|
| 2 | 1.85 | 6.28 | 5.81 | 12.10 |
| 4 | 3.85 | 12.57 | 12.10 | 24.66 |

In a particular implementation, corresponding gpm/inch weir length in just two circular large perforation areas (e.g., regions of second through holes 312) is 17.79 gpm/inch. Such measurements are based on process data from n butane and isobutane binary isomer separation.

The configuration of plate 300 increases the length of the weirs, as compared to plate 200 of FIG. 2. Increasing the weir lengths can reduce weir loadings, in some implementations by as much as a factor of five compared to linear weirs. Thus, plate 300 may be suitable for higher liquid loading levels than plate 200. For example, plate 300 may be suitable for 20 gpm/inch or higher liquid loading levels, such as in C3 splitter, C4 isomer separations or butyraldehyde isomer separations.

Referring to FIGS. 4A and 4B, schematic sectional views of plate 200 and plate 300 are shown. Referring to FIG. 4A, plate 200 includes a first surface 402 (e.g., a top surface) and a second surface 404 (e.g., a bottom surface) opposite to first surface 402. Through holes extend from first surface 402 to second surface 404 (e.g., through an entire thickness of plate 200). For example, first through holes 210 and second through holes 212 extend from first surface 402 to second surface 404, thereby enabling liquid to flow from first surface 402 to the second surface 404 and below plate 200 (or vapor to flow from beneath second surface 404 to above first surface 402).

Weirs are coupled to first surface 402 and extend from first surface 402. For example, first weir 202, second weir 204, third weir 206, and fourth weir 208 are coupled to and extend from first surface 402. Weirs 202-208 are disposed in parallel and between regions of through holes with different diameters. For example, first weir 202 is disposed between a first set of first through holes 210 and a second set of second through holes 212, second weir 204 is disposed between the second set of second through holes 212 and a third set of first through holes 210, third weir 206 is disposed between the third set of first through holes 210 and a fourth set of second through holes 212, and fourth weir 208 is disposed between the fourth set of second through holes 212 and a fifth set of first through holes 210 (not shown). In some implementations, one or more support structures may be coupled to second surface 404 to support plate 200 and to keep plate 200 from bending or bowing.

Referring to FIG. 4B, plate 300 includes a first surface 406 (e.g., a top surface) and a second surface 408 (e.g., a bottom surface) opposite to first surface 406. Through holes extend from first surface 406 to second surface 408 (e.g., through an entire thickness of plate 300). For example, first through holes 310 and second through holes 312 extend from first surface 406 to second surface 408, thereby enabling liquid to flow from first surface 406 to second surface 408 and below plate 300 (or vapor to flow from beneath second surface 408 to above first surface 406).

Weirs are coupled to first surface 406 and extend from first surface 406. For example, third weir 306 and fourth weir 308 are coupled to and extend from first surface 406. Weirs 306 and 308 form concentric circles and are disposed between regions of through holes with different diameters. For example, third weir 306 is disposed between a set of second through holes 312 (not shown) and a set of first through holes 310, and fourth weir 308 is disposed between the set of first through holes 310 and a set of second through holes 312.

Referring to FIGS. 5A and 5B, top views of multiple plates are shown. Although different plates are illustrated in FIGS. 5A and 5B, such example is not limiting, and in other implementations, one or more of the plates of FIG. 5A may be used with one or more of the plates of FIG. 5B.

FIG. 5A illustrates first plate 502 and second plate 504. In a particular implementation, first plate 502 is included in first tray 114 and second plate 504 is included in second tray 116 such that first plate 502 is disposed above and over second plate 504 in distillation column 102. Plates 502, 504 include regions having first through holes 506 (with a first diameter) and regions having second through holes 508 (with a second diameter that is different than the first diameter). In a particular implementation, first through holes 506 include or correspond to first through holes 210 of FIG. 2, and second through holes 508 include or correspond to second through holes 212 of FIG. 2. Weirs are coupled to plates 502, 504. For example, weir 510 is coupled to first plate 502, and weir 512 is coupled to second plate 504.

First plate 502 is configured in a first orientation 514, and second plate 504 is configured in a second orientation 516 that is different than first orientation 514. In a particular implementation, second orientation 516 is rotated substantially 90° (clockwise or counterclockwise) as compared to first orientation 514. For example, first plate 502 includes a plurality of weirs extending from the first surface in parallel across the plate in first orientation 514, and second plate 504 includes a second plurality of weirs extending from a surface of second plate 504 in parallel across the second plate in second orientation 516 that is perpendicular to first orientation 514. To further illustrate, weirs extend up and down (in the orientation of FIG. 5) on first plate 502, and weirs extend left and right on second plate 504. In other implementations, second orientation 516 is rotated by a different amount, such as substantially 15°, 30°, 45°, 60°, or 75°, as non-limiting examples. Adjacent plates (e.g., adjacent trays) are oriented in such a manner such that regions having first through holes 506 in first plate 502 are at least partially located above regions having second through holes 508 in second plate 504, and regions having second through holes 508 in first plate 502 are located at least partially above regions having first through holes 506 in second plate 504.

FIG. 5B illustrates third plate 520 and fourth plate 522. In a particular implementation, third plate 520 is included in first tray 114 and fourth plate 522 is included in second tray 116 such that third plate 520 is disposed above and over fourth plate 522 in distillation column 102. Plates 520, 522 include regions having through holes 506 (with a first diameter) and regions having second through holes 508 (with a second diameter that is different than the first diameter). In a particular implementation, first through holes 506 include or correspond to first through holes 310 of FIG. 3, and second through holes 508 include or correspond to second through holes 312 of FIG. 3. Weirs are coupled to plates 520, 522 and form concentric circles.

Third plate 520 is configured in a first configuration 524, and fourth plate 522 is configured in a second configuration 526. Configurations 524, 526 refer to locations of regions with first through holes 506, regions with second through holes 508, and weirs. First configuration 524 is different than second configuration 526. For example, third plate 520 includes a plurality of weirs extending from a surface of the third plate and forming concentric circles that separate sets of through holes having the first diameter from sets of through holes having the second diameter, and fourth plate 522 includes a second plurality of weirs extending from a surface of the fourth plate and forming concentric circles that separate sets of through holes having the second diameter from sets of through holes having the first diameter. Adjacent plates (e.g., adjacent trays) may have different configurations such that regions having first through holes 506 in third plate 520 are at least partially located above regions having second through holes 508 in fourth plate 522, and regions having second through holes 508 in third plate 520 are at least partially located above regions having first through holes 506 in fourth plate 522.

Configuration of adjacent trays in this manner (e.g., by orienting adjacent trays differently or placing trays with different configurations adjacent to each other) may provide for a more even distribution of liquid to regions having first through holes 506 and regions having second through holes 508.

Figure 6:
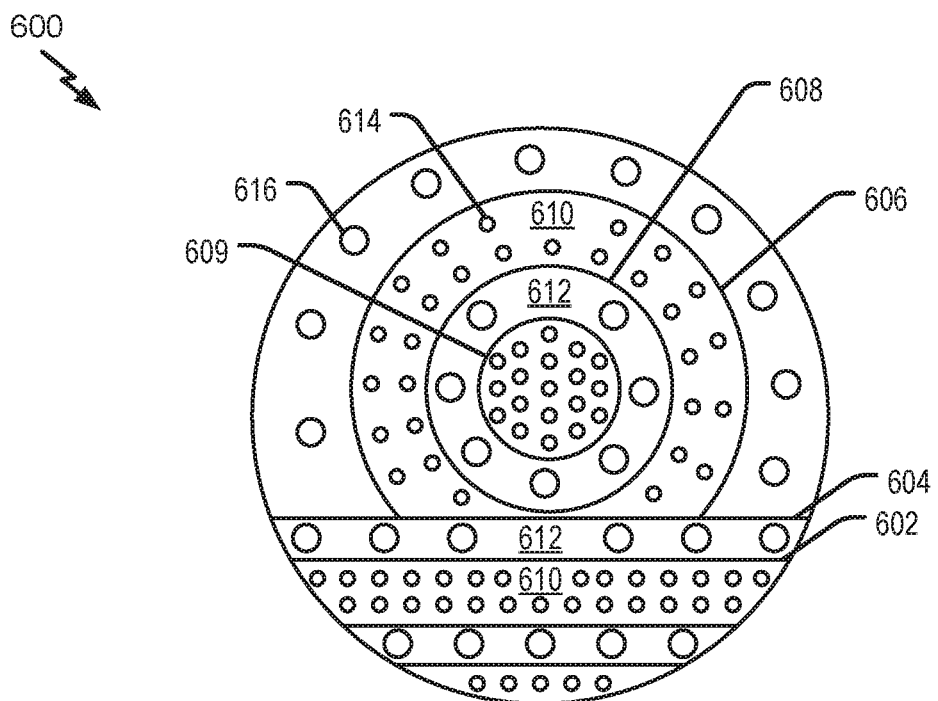
FIG. 6 illustrates a top view of a third implementation of a plate that includes through holes having different diameters.
Figure 7:
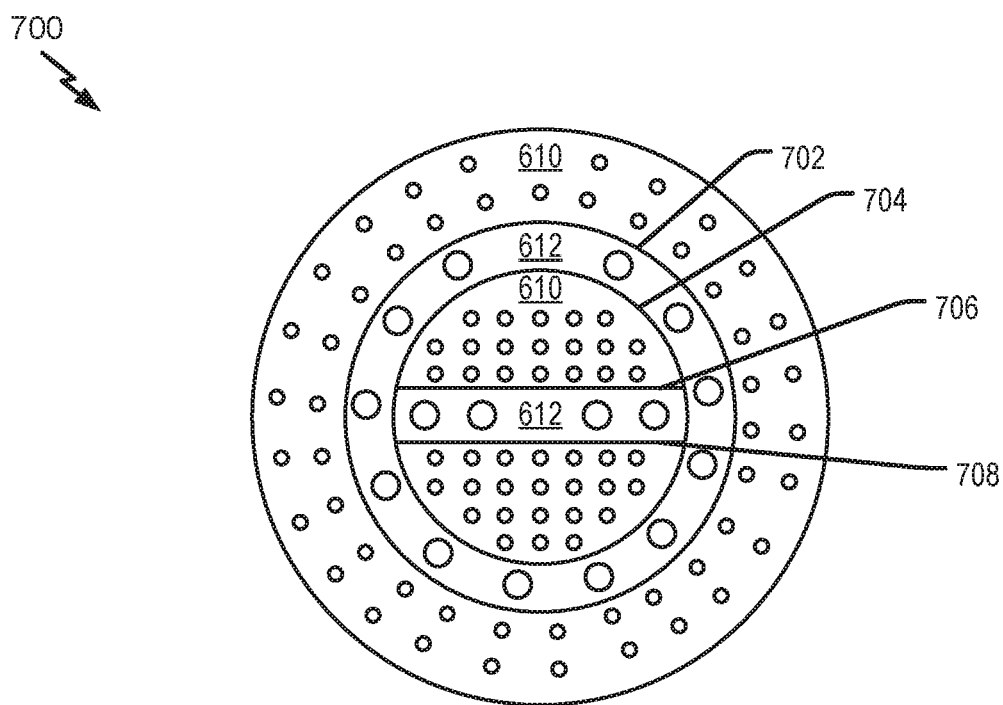
FIG. 7 illustrates a top view of a fourth implementation of a plate that includes through holes having different diameters.

Referring to FIGS. 6 and 7, a plate 600 and a plate 700 that include through holes having different diameters are shown. A tray, such as first tray 114 and/or second tray 116, may include plate 600 or plate 700. FIGS. 6 and 7 illustrate "hybrid" implementations that include both linear and circular weirs.

Referring to FIG. 6, plate 600 includes linear weirs that extend across plate 600, regions of first through holes 610 that extend across plate 600, and regions of second through holes 612 that extend across plate 600. For example, plate 600 includes a first weir 602 and a second weir 604 that are coupled to a surface of plate 600 and positioned in parallel across the plate. A first set of first through holes 610 are disposed on an opposite side (e.g., a bottom side in the orientation illustrated in FIG. 6) of first weir 602 than a second set of second through holes 612. Second set of second through holes 612 are disposed between first weir 602 and second weir 604. First through holes 610 have a first diameter, such as illustrative first through hole 614, and second through holes 612 have a second diameter that is different than the first diameter, such as illustrative second through hole 616. In a particular implementation, first through holes 610 include or correspond to first through holes 210 or 310, and second through holes 612 include or correspond to second through holes 212 or 312.

Plate 600 also includes circular weirs and circular regions of through holes. For example, plate 600 includes a third weir 606, a fourth weir 608, and a fifth weir 609 coupled to and extending from the surface (e.g., a top surface) of the plate. Third weir 606, fourth weir 608, and fifth weir 609 define concentric circles or portions of concentric circles and separate regions of through holes with different diameters. For example, a third set of first through holes 610 are disposed between third weir 606 and fourth weir 608, and a fourth set of second through holes 612 are disposed between fourth weir 608 and fifth weir 609. Although FIG. 6 illustrates four linear weirs and three circular weirs, in other implementations, more than four or fewer than four linear weirs and more than three or fewer than three circular weirs may be included.

Referring to FIG. 7, plate 700 includes circular weirs, circular regions of first through holes 610, and circular regions of second through holes 612. For example, plate 700 includes a first weir 702 and a second weir 704 coupled to and extending from a surface (e.g., a top surface) of the plate. First weir 702 and second weir 704 form (e.g., define) concentric circles. A first set of first through holes 610 are disposed outside first weir 702 and a second set of second through holes 612 are disposed between first weir 702 and second weir 704.

Plate 700 also includes linear weirs and regions of through holes disposed within the circles formed by the circular weirs. For example, plate 700 includes a third weir 706 and a fourth weir 708 that are coupled to and extend from a surface of the plate. Third weir 706 and fourth weir 708 are positioned in parallel across a circle formed by second weir 704. A third set of first through holes 610 are disposed between second weir 704 and third weir 706, and a fourth set of second through holes 612 are disposed between third weir 706 and fourth weir 708. Although FIG. 7 illustrates two circular weirs and two linear weirs, in other implementations, more than two or fewer than two circular weirs and more than two or fewer than two linear weirs may be included.

The hybrid examples of FIGS. 6-7 may provide benefits as compared to other trays. For example, because some of the weirs are circular, the length of the weirs may be longer than linear weirs, which increases the liquid loading levels that can be handled by the corresponding plates. Additionally, or alternatively, some of the weirs and regions are linear, which may simplify a fabrication process. Additionally, the hybrid designs can be deployed in distillation columns that have higher vapor loading as compared to liquid loadings, or in distillation columns where jet flooding is a limiting factor.

Figure 8:
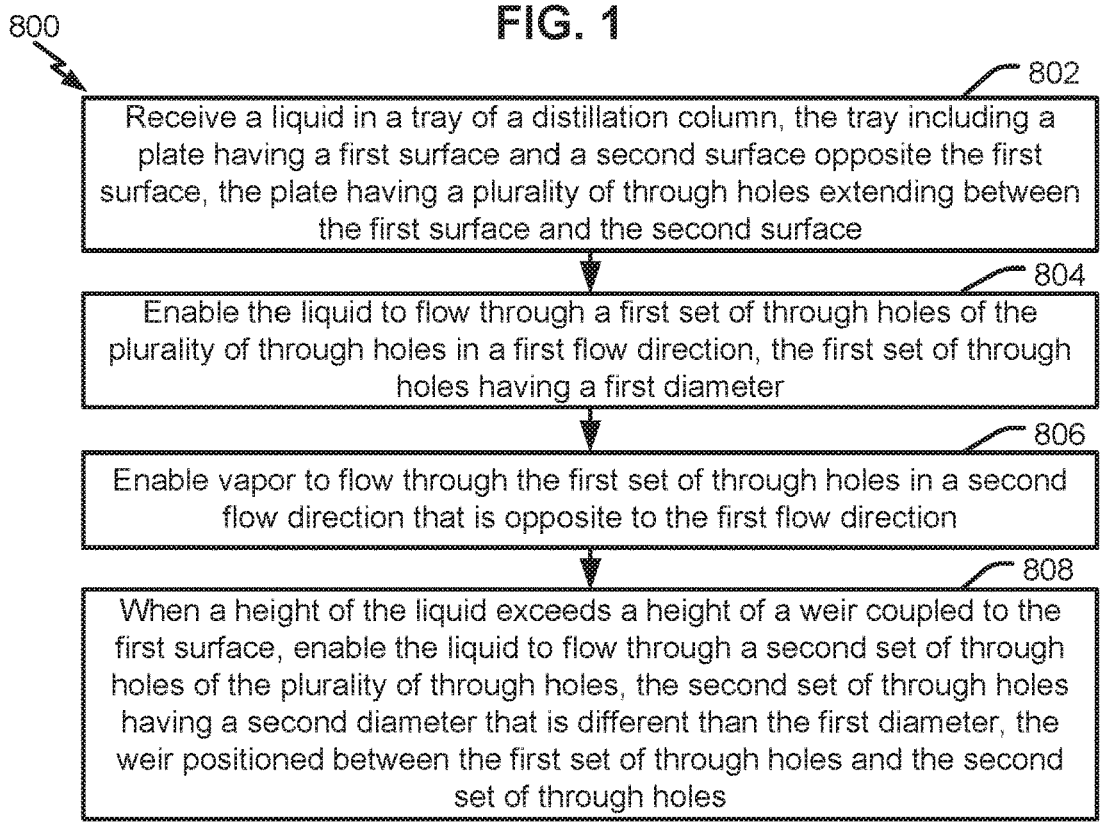
FIG. 8 is a flowchart illustrating an example of a method of using a distillation tray.

Referring to FIG. 8, an example of a method of using a distillation tray is shown. Method 800 may be performed by a distillation tray, such as first tray 114, second tray 116, or trays including plate 200, plate 300, plates 502, 504, 520, and 522, plate 600, or plate 700, as non-limiting examples.

Method 800 includes receiving a liquid in a tray of a distillation column, at 802. The tray includes a plate having a first surface and a second surface opposite to the first surface. The plate has a plurality of through holes extending between the first surface and the second surface. For example, plate 200 may receive liquid (e.g., from a tray located above plate 200 in the distillation column 102) in a region having first through holes 210.

Method 800 includes enabling the liquid to flow through a first set of through holes of the plurality of through holes in a first flow direction, at 804. The first set of through holes have a first diameter. For example, liquid may flow through a first set of first through holes 210 having a first diameter. To further illustrate, if plate 200 is included in first tray 114, the liquid may flow down to second tray 116.

Method 800 includes enabling vapor to flow through the first set of through holes in a second flow direction that is opposite the first flow direction, at 806. For example, vapor may flow up from a lower tray (e.g., second tray 116) through the first set of first through holes 210.

Method 800 also includes, when a height of the liquid exceeds a height of a weir coupled to the first surface, enabling the liquid to flow through a second set of through holes of the plurality of through holes, at 808. The second set of through holes have a second diameter that is different than the first diameter, and the weir is positioned between the first set of through holes and the second set of through holes. For example, when the height of the liquid exceeds the height of first weir 202, the liquid flows over first weir 202 to a second set of second through holes 212, and the liquid flows through the second set of second through holes 212 in the first flow direction (e.g., to the tray beneath plate 200).

Thus, method 800 enables a distillation tray without downcomers to operate in a similar manner to a distillation tray with downcomers. Because there are no downcomers, fabrication of the distillation tray may be easier and less expensive. Additionally, cleaning of the distillation tray may be easier, which reduces an amount of downtime for cleaning and extends the useful life of the distillation tray.

The above specification and examples provide a complete description of the structure and use of illustrative implementations. Although certain implementations have been described above with a certain degree of particularity, or with reference to one or more individual implementations, those skilled in the art could make numerous alterations to the disclosed implementations without departing from the scope of this disclosure. As such, the various illustrative implementations of the methods and systems are not intended to be limited to the particular forms disclosed. Rather, they include all modifications and alternatives falling within the scope of the claims, and implementations other than the one shown may include some or all of the features of the depicted implementations. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one implementation or may relate to several implementations. Accordingly, no single implementation described herein should be construed as limiting and implementations of the disclosure may be suitably combined without departing from the teachings of the disclosure.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A tray for use in a distillation column, the tray comprising:
   a plate comprising a first surface and a second surface opposite the first surface, the plate having a plurality of through holes extending between the first surface and the second surface, the plurality of through holes comprising:
   a first set of through holes each having substantially a first diameter; and
   a second set of through holes each having substantially a second diameter different from the first diameter; and
   a weir coupled to the plate and extending from the first surface, the weir positioned between the first set of through holes and the second set of through holes;
   wherein the first set of through holes and the second set of through holes are configured to enable liquid to flow below the plate without use of downcomers.

2. The tray of claim 1, wherein the first diameter is substantially 4.75 millimeters and the second diameter is substantially 12.5 millimeters.

3. The tray of claim 1, wherein the second diameter is larger than the first diameter.

4. The tray of claim 1, wherein the first diameter is substantially 4.75 millimeters and the second diameter is substantially 19 millimeters.

5. The tray of claim 1, wherein the first diameter is between 4.75 millimeters and 12.5 millimeters and the second diameter is between 12.5 millimeters and 19 millimeters.

6. The tray of claim 1, further comprising a second weir and a third weir extending from the first surface;
   wherein the weir, the second weir, and the third weir are positioned in parallel across the plate;
   wherein the first set of through holes are disposed between the second weir and the weir; and
   wherein the second set of through holes are disposed between the weir and the third weir.

7. The tray of claim 1, further comprising a second weir and a third weir extending from the first surface;
   wherein the weir, the second weir, and the third weir define concentric circles;
   wherein the first set of through holes are disposed between the second weir and the weir, and
   wherein the second set of through holes are disposed between the weir and the third weir.

8. The tray of claim 1, wherein a diameter of the tray is greater than or equal to 2 meters.

9. A tray for use in a distillation column, the tray comprising:
   a plate comprising a first surface and a second surface opposite the first surface, the plate having a plurality of through holes extending between the first surface and the second surface, the plurality of through holes comprising:
   a first set of through holes each having a first diameter within a first range;
   a second set of through holes each having a second diameter within a second range different from the first range;
   a third set of through holes each having a third diameter within the first range; and
   a fourth set of through holes each having a fourth diameter within the second range; and
   a plurality of weirs coupled to the plate and extending from the first surface, the plurality of weirs comprising:
   a first weir positioned between the first set of through holes and the second set of through holes;
   a second weir positioned between the second set of through holes and the third set of through holes; and
   a third weir positioned between the third set of through holes and the fourth set of through holes.

10. The tray of claim 9, wherein the first weir and the second weir are positioned in parallel across the plate;
    wherein the first set of through holes are disposed on an opposite side of the first weir than the second set of through holes; and
    wherein the second set of through holes are disposed between the first weir and the second weir.

11. The tray of claim 10, further comprising a fourth weir extending from the first surface,
    wherein the third weir and the fourth weir are positioned in parallel to the first weir and the second weir;
    wherein the third set of through holes are disposed between the second weir and the third weir; and
    wherein the fourth set of through holes are disposed between the third weir and the fourth weir.

12. The tray of claim 10, further comprising a fourth weir and a fifth weir extending from the first surface;
    wherein the third weir, the fourth weir, and the fifth weir define concentric circles or portions of circles;
    wherein the third set of through holes are disposed between the third weir and the fourth weir; and wherein the fourth set of through holes are disposed between the fourth weir and the fifth weir.

13. The tray of claim 9, wherein the first weir and the second weir form concentric circles;
   wherein the first set of through holes are disposed outside of the first weir; and
   wherein the second set of through holes are disposed between the first weir and the second weir.

14. The tray of claim 13, further comprising a fourth weir extending from the first surface;
   wherein the third weir and the fourth weir are positioned in parallel across a circle formed by the second weir;
   wherein the third set of through holes are disposed between the second weir and the third weir; and
   wherein the fourth set of through holes are disposed between the third weir and the fourth weir.

15. A system comprising:
   a distillation column comprising:
   a housing defining a chamber; and
   a plurality of trays positioned within the chamber, the plurality of trays comprising at least one tray comprising:
   a plate comprising a first surface and a second surface opposite the first surface, the plate having a plurality of through holes extending between the first surface and the second surface, the plurality of through holes comprising:
   a first set of through holes each having substantially a first diameter; and
   a second set of through holes each having substantially a second diameter different from the first diameter; and
   a weir coupled to the plate and extending from the first surface, the weir positioned between the first set of through holes and the second set of through holes;
   wherein the plurality of trays further comprises a second tray that is positioned proximate to the at least one tray within the chamber; and
   wherein the at least one tray includes a plurality of weirs extending from the first surface in parallel across the plate in a first orientation; and
   wherein the second tray includes a second plurality of weirs extending from a surface of a second plate of the second tray in parallel across the second plate in a second orientation that is different than the first orientation.

16. The system of claim 15, wherein the second orientation is substantially perpendicular to the first orientation.

17. The system of claim 15, wherein a third tray includes a third plurality of weirs extending from a surface of a third plate and forming concentric circles that separate sets of through holes having substantially the first diameter from sets of through holes having substantially the second diameter; and
   wherein a fourth tray includes a fourth plurality of weirs extending from a surface of a fourth plate of the fourth tray and forming concentric circles that separate sets of through holes having substantially the second diameter from sets of through holes having substantially the first diameter.

* * * * *